United States Patent [19]

Huang

[11] Patent Number: 5,651,447

[45] Date of Patent: Jul. 29, 1997

[54] SELF-SCOOPING BUCKET CONVEYOR

[75] Inventor: Yada Huang, Zweibrücken, Germany

[73] Assignee: PWH Anlagen & Systeme GmbH, St. Ingbert, Germany

[21] Appl. No.: 525,642

[22] PCT Filed: Jan. 7, 1995

[86] PCT No.: PCT/EP95/00051

§ 371 Date: Sep. 6, 1995

§ 102(e) Date: Sep. 6, 1995

[87] PCT Pub. No.: WO95/19313

PCT Pub. Date: Jul. 20, 1995

[30] Foreign Application Priority Data

Jan. 15, 1994 [DE] Germany .......................... 44 01 042.7
Nov. 8, 1994 [DE] Germany .......................... 44 39 867.0

[51] Int. Cl.⁶ .................................................. B65G 17/36
[52] U.S. Cl. ..................... 198/509; 198/861.2; 414/141.1
[58] Field of Search .............................. 198/509, 511, 198/519, 813, 814, 861.1, 861.2; 414/142.5, 141.1

[56] References Cited

U.S. PATENT DOCUMENTS

| | | | |
|---|---|---|---|
| 4,830,177 | 5/1989 | Baba et al. | 198/509 |
| 4,860,884 | 8/1989 | Kostrewa | 198/509 |
| 4,890,719 | 1/1990 | Yagi et al. | 198/509 X |
| 4,917,234 | 4/1990 | Seymour | 198/509 X |
| 4,988,250 | 1/1991 | Yamanaka | 198/509 X |
| 5,409,343 | 4/1995 | Fredrich | 198/509 X |

FOREIGN PATENT DOCUMENTS

| | | |
|---|---|---|
| 59-078012 | 5/1984 | Japan . |
| 92-12084 | 7/1992 | WIPO . |

Primary Examiner—D. Glenn Dayoan
Attorney, Agent, or Firm—Herbert Dubno; Andrew Wilford

[57] ABSTRACT

The invention relates to an L-shaped bucket conveyor, in particular a ship unloader, that has a vertical conduit and a bucket-conveyor foot movable vertically relative to the conduit and having in turn a generally vertically extending section and a generally horizontally extending section. In order to match ship movements there are vertical and if necessary also tipping cylinders in the bucket-conveyor foot. Hydraulic cylinders tighten and/or balance the tension element. According to the invention tightening of the chain and producing the digging force are done separately and are adjustable by the horizontal as well as the vertical and tipping cylinders and compensating for changes in chain length is achieved between the horizontal and vertical sections via the hydraulic coupling between the horizontal and vertical cylinders. The buckets thus move horizontally, the horizontal section moves about a pivot between the vertical and horizontal sections, and the entire bucket-conveyor foot moves vertically. The chain tension and the digging force between the material being conveyed and the bucket-conveyor foot thus remain constant during use. The bucket-conveyor foot automatically matches the ship movements so that it can achieve maximum operating efficiency.

14 Claims, 14 Drawing Sheets

SELF-SCOOPING BUCKET CONVEYOR

The invention relates to a self-scooping L-shaped bucket conveyor, in particular a boat unloader, having an endless tension element on which buckets are secured and a bucket-conveyor foot which has a generally vertical section and a generally horizontal section, and at least one horizontal cylinder for tensioning and/or balancing the tension element and at least one vertical cylinder for supporting the bucket-conveyor foot.

A vertical conveyor of the known type which is in particular used as a ship unloader is described in EP 0,236, 845. This vertical conveyor has an upper rotatable part pivotable about an upright axis and on whose lower end is a swing-out part. Both drums of the bucket conveyor are supported by guides for pivoting outward and are so guided on the lower end via a deflector roller that it can work in the so-called deep. In order to achieve maximum conveying capacity the swing-out part is connected on its lower end to a pivoted swing-out projecting foot part that is connected with the lower part such that it is held or moved into a horizontal position in every swung-out position. The swing-out part is formed by two links together forming a parallelogrammatic linkage to whose upper part is engaged a hydraulic cylinder. To tighten the tension element there is for example a separate tensioning device comprised also of hydraulic cylinders which can be actuated by a controller. According to the height of the bucket conveyor and the position of the horizontal outrigger part the tension-element, tension is measured and set by means of a feedback control circuit. This creates delays that are dangerous in that they can result in damage to the bucket conveyor.

German 4,100,852 describes a ship unloader with a vertically extending section that is on an outrigger and that carries on its lower end a generally horizontally extending section. The chains of the bucket conveyor are guided in the vertical and horizontal sections over deflectors. To lift the horizontal section relative to the vertical section lifting devices are provided in the vertical section so that the changes of the chain length can be compensated for by equalizing devices in the horizontal section. To this end one uses specific sensors in the form of position detectors, pressure sensors, strain gauges, etc. that work with or without feedback to control the corresponding hydraulic cylinder, for example for tightening the chains.

Even this system has the disadvantage that unavoidable delays takes place between when a new condition is detected and the reaction (adjustment of the chain tension). In addition the necessary control is very expensive and hard to effect.

When unloading a ship there are vertical and tipping movements relative to the bucket-conveyor foot that require an immediate adjustment of the position of the bucket-conveyor foot in the bulk material. At the same time it is necessary to maintain the digging force of the bucket conveyor and the tension in the tension element as constant as possible so as to obtain maximum conveyor efficiency.

It is an object of the invention to improve on a vertical conveyor so that the movement of the bucket-conveyor foot can be coordinated without great technical complexity to the ship movements without exceeding the desired tension and digging force.

This object is attained by the bucket conveyor which is characterized according to the invention in that the vertical and horizontal cylinders are connected together via a hydraulic line such that, absent active control intervention, extension of a vertical hydraulic-cylinder part due to a dropping of the bucket-conveyor foot causes a corresponding retraction of the horizontal hydraulic-cylinder part and oppositely a retraction of the vertical hydraulic-cylinder part due to a raising of the bucket-conveyor foot causes a corresponding extension of the horizontal-cylinder part. In this way the invention has the advantage that there is passive control without active position and/or pressure sensors and corresponding actuation of an adjustment element. Because of the resulting vertical force the bucket-conveyor foot follows a downward movement of the bulk material in the ship with an extension of the piston rod of the vertical cylinder. The necessary length equalization is effected by retraction of the piston rod of the horizontal or the cylinder connected with the horizontal section. Oppositely when the ship goes up the piston rod of the vertical cylinder is shifted in and the thus caused fluid displacement pushes out the piston rod of the horizontal cylinder. The tension-element force and the digging force between the bulk material and the bucket-conveyor foot remain constant during use. The bucket-conveyor foot automatically matches the ship movements so that the bucket conveyor operates at maximum conveying efficiency. One is basically using the known principle for coordinating the movements between two independent systems and maintaining constant the forces effective between the two systems, whereby the mass of the system to be controlled is very small compared to the mass of the system that initiates the movement and that the movements of the larger mass take place with limited acceleration or deceleration.

Further aspects of the invention are described in the dependent claims.

In order that the bucket-conveyor foot can also automatically match pitching of the ship, it is preferably provided that the vertical section and the horizontal section are connected together at a pivot by means of at least one tipping cylinder for pivoting about a horizontal axis. Preferably also even a change in length of the chain can be compensated for by a change in the angle of the horizontal section.

Preferably the tension element is formed of two or more endless chains.

According to a further embodiment of the invention the hydraulic medium additionally pumpable by means of a switchable pump into the vertical hydraulic cylinder compensates for the mass of the bucket conveyor or exerts an additional pressure on the bucket-conveyor foot. In this manner three requirements are taken into account, namely that the mass of the bucket-conveyor foot is very large to require an application of tension in order to avoid overstressing the buckets or to be too difficult to measure. If the mass of the bucket-conveyor foot is too small the desired digging force is produced, which can be done by the vertical-cylinder piston.

The pump can also be switched on and off according to pressure. In order to prevent the pressure in the vertical cylinder from falling when the pump is turned off or disconnected the pump is downstream of a check valve.

The vertical cylinder is preferably provided on both sides with an end-position damper for its piston which according to a further feature of the invention can be mechanical or hydraulic. A mechanical end damping can for example be done by spring washers in the ends of the cylinder, either inside or outside the cylinder.

Respective pressure reservoirs are connected with the piston-defined compartments of the vertical cylinder and supply same so that excellent pressure stabilization is achieved. Further pressure stabilization is achieved by pressure-limiting valves, in particular for maintaining the tension-element tension or the digging force of the buckets constant. These pressure-limiting valves close for example when the desired pressure is exceeded or undershot by a predetermined amount, e.g. 5%.

According to a further embodiment of the invention the vertical hydraulic cylinder has a sensor for detecting a predetermined maximum engagement force and/or the height of the bucket-conveyor foot and/or and to initiate a lifting of the entire bucket conveyor. When the maximum engagement force is attained the entire bucket conveyor is raised.

Further problems are given when cleaning up, that is the operation where the remaining material lying on the floor of the ship is to be taken up. In this phase one must work with reduced digging force. According to the apparatus described in EP 0,401,406 the chain elements are loosened on the lower guides so that the chain with the buckets hangs along a free chain line and the movements of the ship are compensated for by the flexibility of the hanging chain. In this manner one does in fact no longer actively move the hanging chain but this system is not usable for compensating out ship movements in normal use. In addition when the chain is hanging it is necessary to employ expensive drives and guides relative to the standard chain drives. Even when operating in clean up the present invention has according to a further embodiment a simpler solution in that one switches over from normal operation to clean-up operation by using a further or additional pressure-limiting valve with another operating characteristic alternatively or in parallel.

In order to be able to take into account different loads of the horizontal region, further vertical and horizontally arranged hydraulic cylinders are provided to change the loading of the bucket-conveyor foot parallel to the hydraulic cylinders provided for holding the bucket-conveyor foot and for tightening and/or balancing the tension element.

Figure 1:
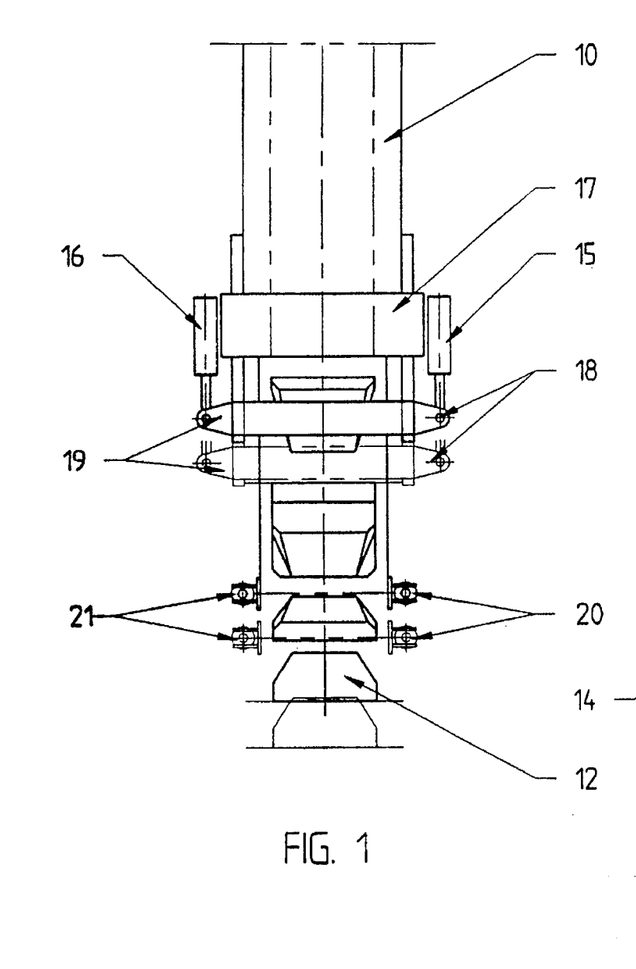
FIGS. 1 and 2 are partial views of a bucket-conveyor foot in different views.
Figure 2:
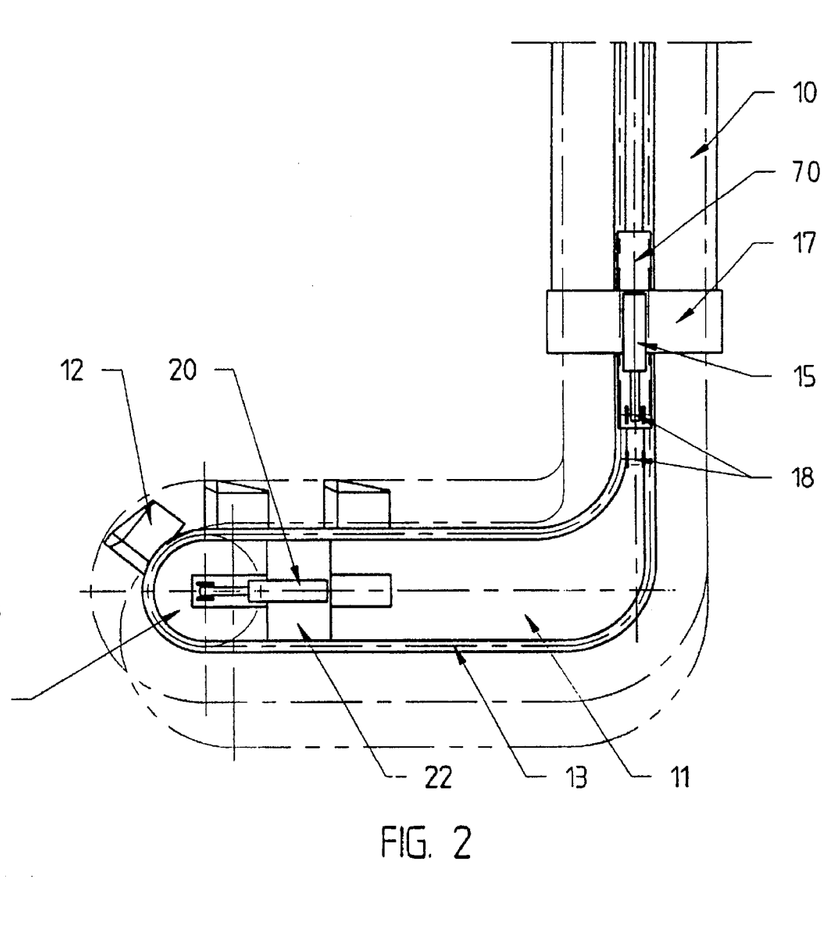

The bucket conveyor shown in FIGS. 1 and 2 has a conduit 10 with a conveyor path and a bucket-conveyor foot with a vertical section 70 and a horizontal section 11. The buckets 12 are moved by illustrated chains 13 in the horizontal section 11, in the vertical section 10, and in the conduit 10. Sprocket wheels 14 act as deflectors in the horizontal section 11 and in the vertical section 70. To retain the bucket-conveyor foot on the conduit 10 there are two vertical hydraulic cylinders 15 and 16 which are supported at one end in a support bracket 17 of the vertical section 70 and at the other end in support brackets 18 and 19 of the conduit 10. To adjust the chain length and maintain its tension constant there are in the horizontal section 11 hydraulic cylinders 20 and 21 which are braced at one end on a support bracket 22 and at the other end on the sprocket 14. The hydraulic circuit it shown in FIGS. 3 through 5.

Figure 10:
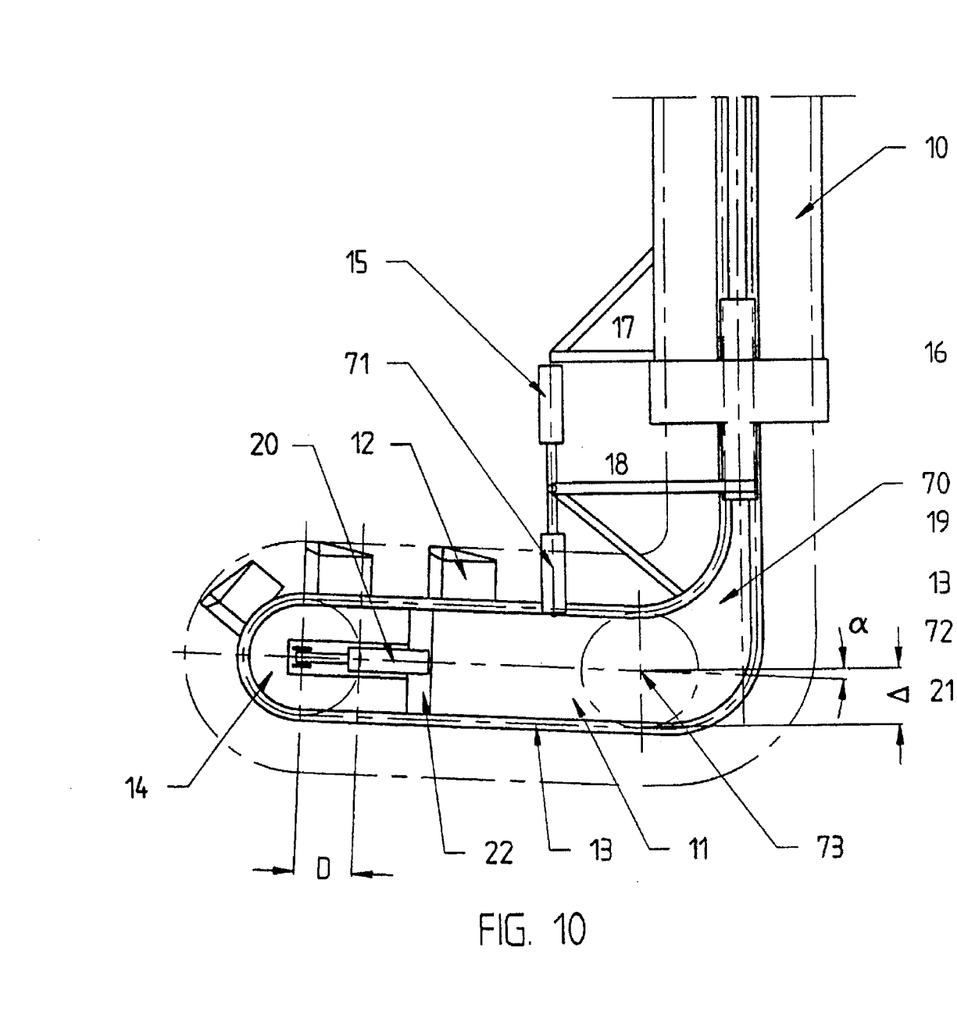
FIGS. 10 and 11 are side and end views of a further embodiment.
Figure 11:
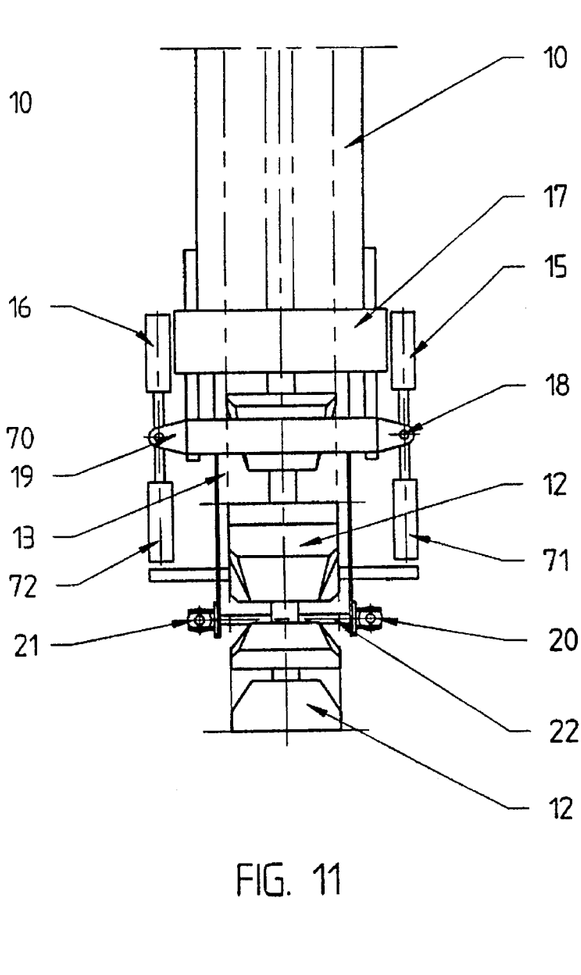

The embodiment according to FIGS. 10 and 11, where the same parts as in the embodiment according to FIG. 1 have the same references, also has between the brackets 18 and 19 and the horizontal section 11 respective pivoted tipping cylinders 71 and 72 which permit a pivoting of the horizontal section 11 about a pivot 73 relative to the vertical region 70.

Figure 3:
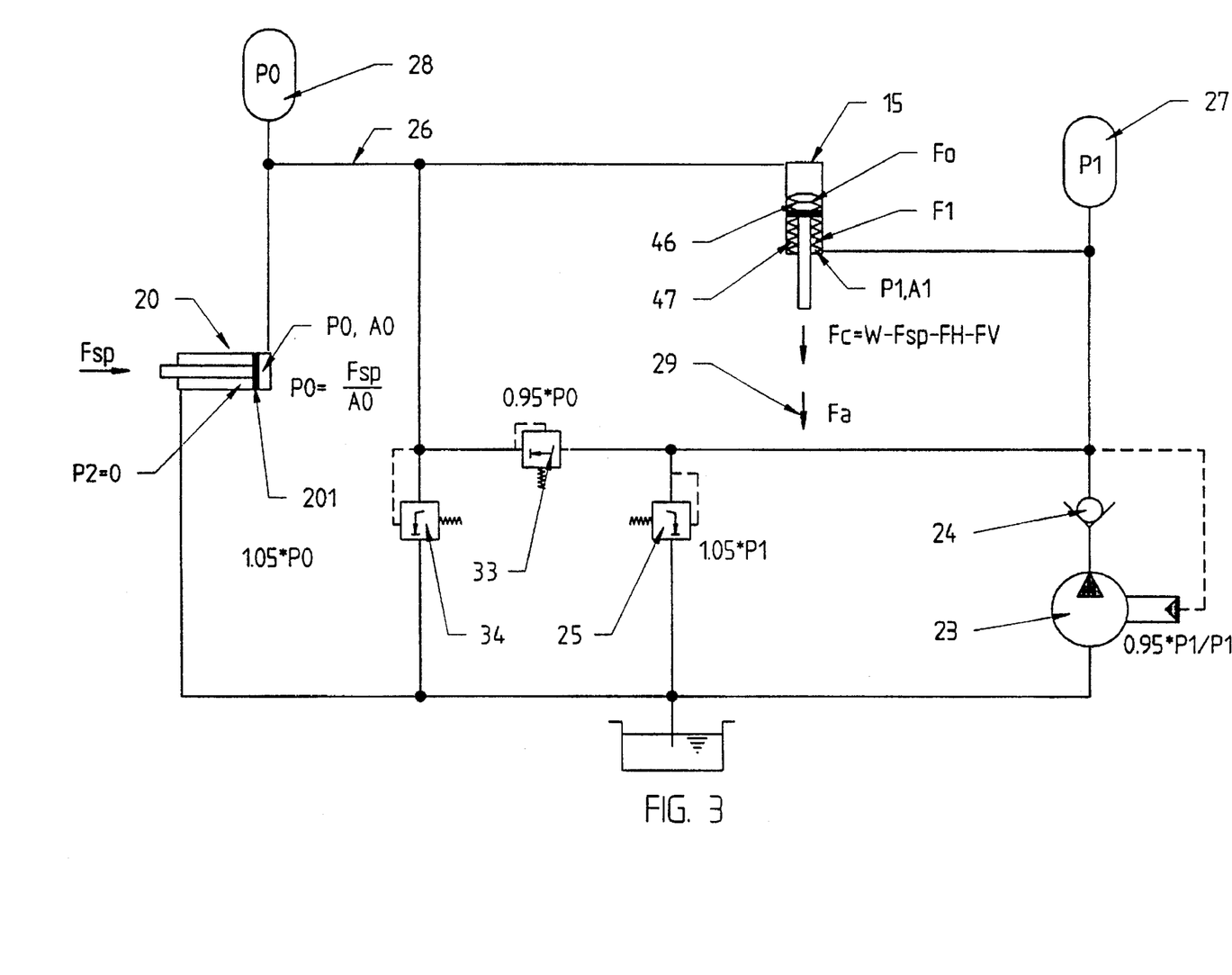
FIGS. 3, 4, and 5 are main circuit diagrams of the hydraulic system.

For FIG. 3 it is assumed that the bucket-conveyor foot has its own substantial mass. In order to compensate for this mass as much as possible so that the necessary digging force is attained, it is necessary to exert traction on the bucket-conveyor foot, that is the force $p_1$ in the lower compartment of the vertical cylinder 15 must be greater than the force $p_0$ in the upper compartment of the double-acting cylinder. To this end a pump 23 is used which creates the necessary pressure. This pump is controlled so that it only is turned on when the starting pressure has dropped to a predetermined level of e.g. 0.95. $p_1$ and switches off when the pressure reaches the level $p_1$. The check valve 24 on the pump output ensures that the pressure does not drop when the pump is not operating. Pressure-limiting valves 25, 33, and 34 protect the pressures $p_0$ and/or $p_1$ from pressures that are too high or too low. The cylinders 15 and 20 are connected together on their piston sides by a conduit 26. This ensures that a shortening of the chain stretch in the vertical section (when the vertical cylinder 15 is contracted) is compensated for by a corresponding lengthening of the stretch in the horizontal section 11. The pressure reservoirs 27 and 28 ensure nearly constant hydraulic pressure. The compartment on the other side of the piston 201 has a pressure $p_2=0$.

Arrow 29 shows that the foot cannot be stressed too much in the direction that is the responsibility of the piston 15. When it reaches the required actuation force the lifting system carrying the bucket conveyor receives a signal and moves the conveyor upward in order to unload the foot. This function can be achieved by an end switch.

In particular the following references apply:

| | |
|---|---|
| $F_a$ | actuating force ($-F_{a1} \leq F_a \leq F_{a2}$) |
| $F_o$ | upper spring force |
| $F_1$ | lower spring force |
| $F_{sp}$ | tension in the chain |
| $F_c$ | force in the piston rod of the vertical cylinder |
| $F_H$ | horizontal digging resistance on the buckets |
| $F_V$ | digging force of the bucket conveyor |
| W | weight of the foot |
| $P_0, P_1, P_2$ | hydraulic pressure |
| $A_0, A_1$ | surface areas of the pistons. |

Figure 4:
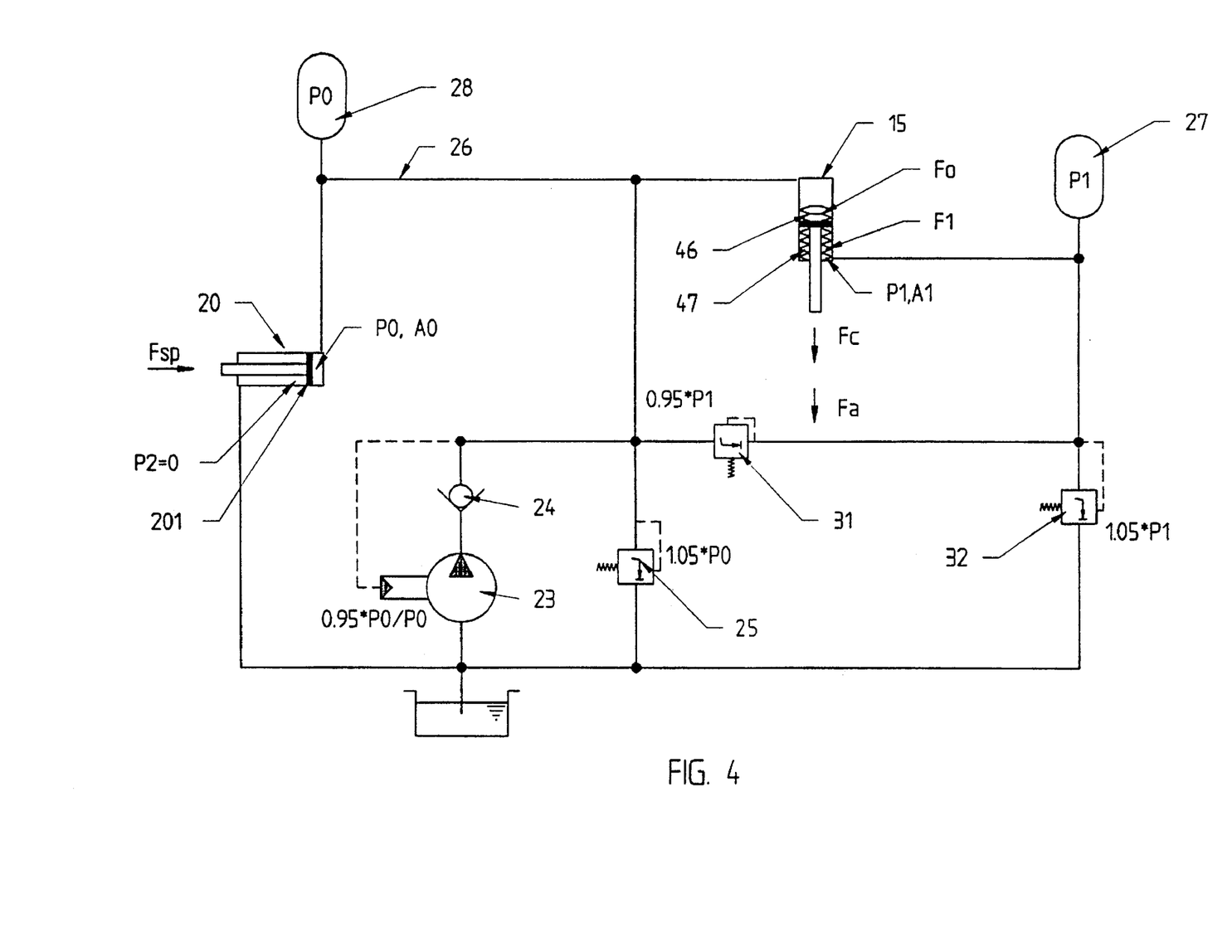

FIG. 4 shows an alternative hydraulic circuit for the case when the mass of the foot is equal to or nearly equal to that necessary to bring to bear the necessary digging force. In this case the pressure $P_0$ in the upper compartment of the cylinder 15 is greater than the pressure $P_1$. Correspondingly the pump 23 is connected to the piston side of the cylinder to produce the pressure $P_0$. The valves 32 and 31 limit the pressures as described above. The same references as in FIG. 3 are used for the same parts in FIG. 4.

Figure 5:
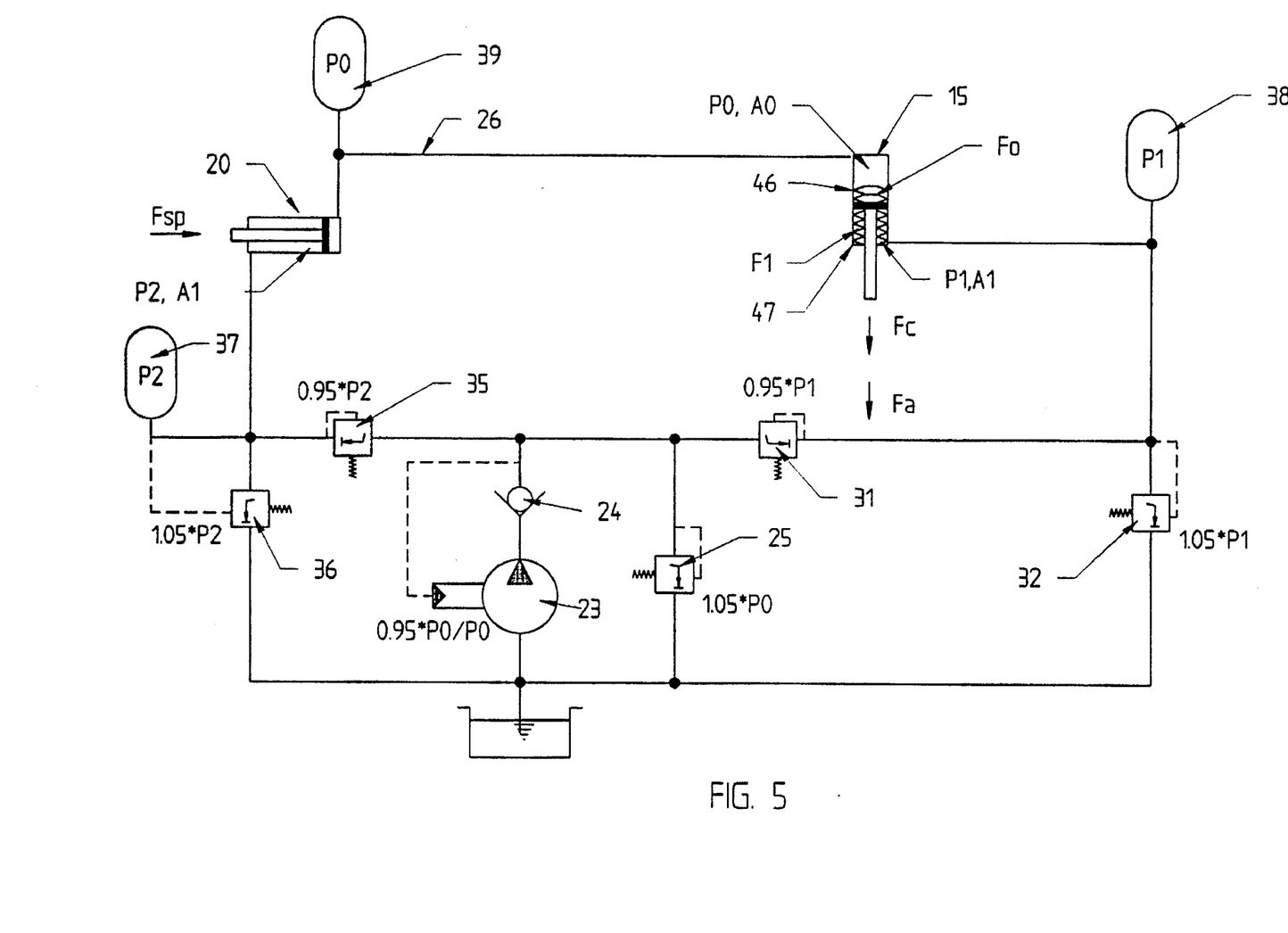

While with the circuit according to FIGS. 3 and 4 the pressure $P_0$ is effectively set by the tension $F_{sp}$ in the chain, the circuit according to FIG. 5 is set up such it can compensate for insufficient mass of the bucket-conveyor foot when it is not enough to create sufficient digging force. Here additional pressure is created by the vertical hydraulic cylinder 15 in order to create sufficient digging force with the (too small) mass of the foot. This pressure is created by the pressure $P_0$ of the pump 23 on the piston side of the cylinder 15. The tension of the chain is formed by the difference between the hydraulic forces $P_0 \cdot A_0$ and $P_2 \cdot A_1$ on the opposite faces of the piston of the cylinder 20, with $A_0$ and $A_1$ being the respective piston surface areas. The valves 32, 31 and 35, 36 ensure that the pressures $P_1$ and $P_2$ only vary at most by 5% above the respective values $p_1$ and $p_2$. The pressure reservoirs 37 through 39 further serve to stabilize the pressures $p_0$, $p_1$, and $p_2$ in the lines.

The circuits described in FIGS. 3 through 5 are intended for normal use.

Figure 6:
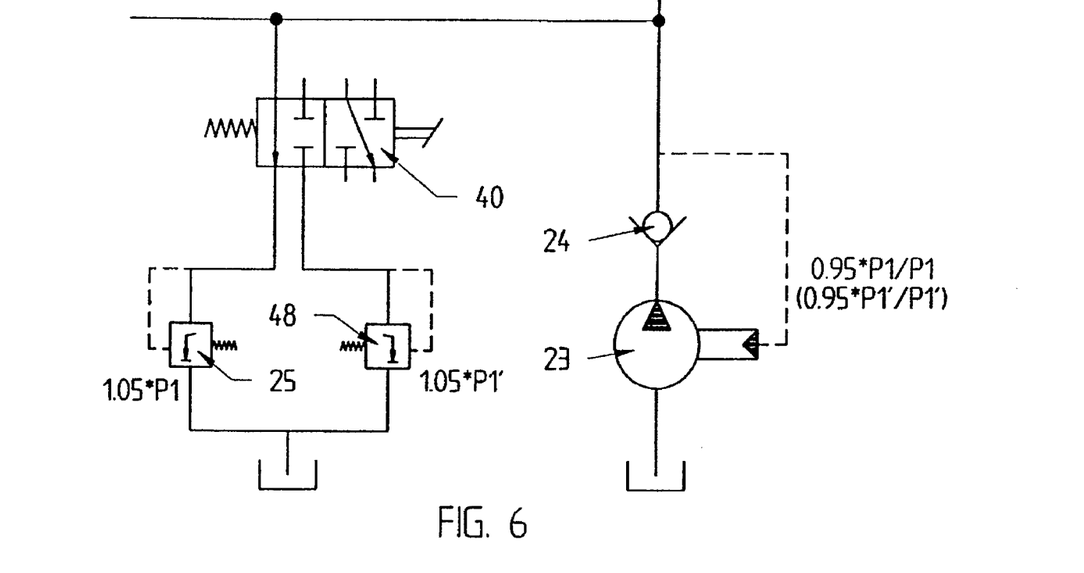
FIG. 6 is a partial view of the hydraulic system of FIG. 3 switched for clean up.

For clean up one needs less digging force. In order to account for this lesser need of force the pressure $p_1$ in the FIG. 3 circuit must be increased which is possible by means of another pressure-limiting valve 48 to create a higher pressure $P_1$. FIG. 6 shows how a corresponding circuit with a reversing valve 40 protects the additional pressure-limiting valve 48 of the hydraulic system from the wrong pressure during clean up.

Figure 7:
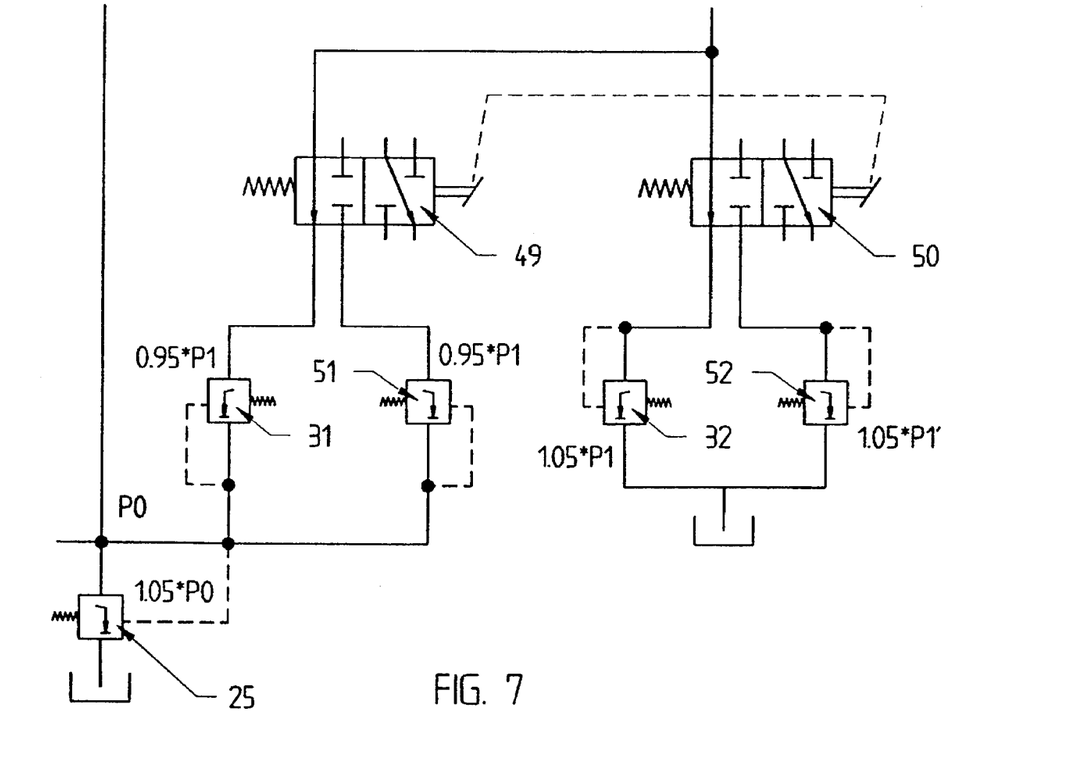
FIG. 7 are further partial views of the cleaning-up setup in a further embodiment for the circuits according to FIGS. 4 and 5.

Correspondingly the valves 31 and of FIGS. 4 and 5 can be replaced by the partial circuit according to FIG. 7 by the reversing valves 49 and 50 with the valves 51 and 52 taking into account that the relationship $P_0 < P_1$ is not changed even by the changed setting of $p_1$.

Figure 8:
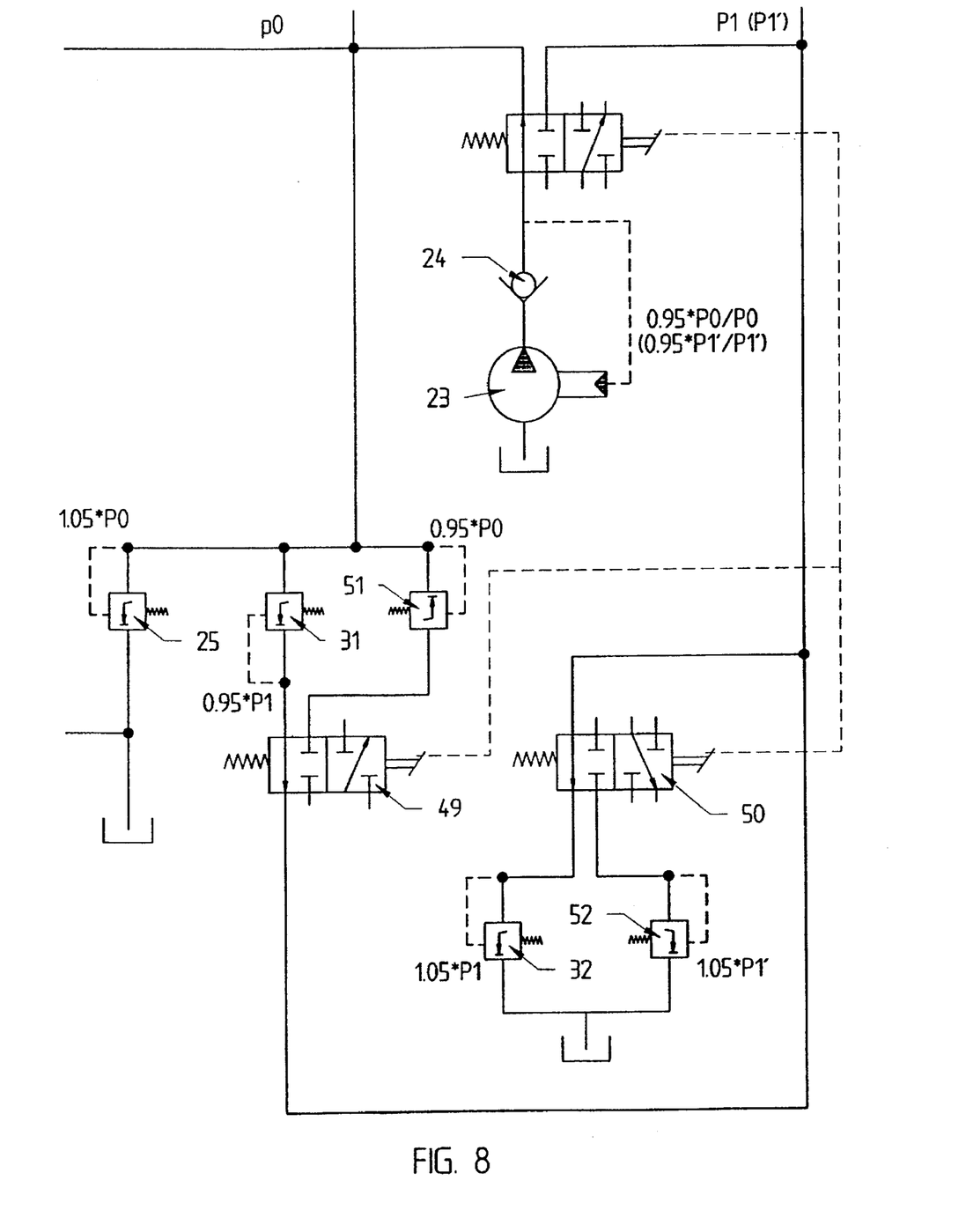
FIG. 8 is a partial view of a further cleaning-up setup.

The case when the changed pressure $p_1$, should be larger than the $p_0$ in the circuits according to FIGS. 4 and 5 is accounted counted for in FIG. 8 in that the pump 3 is arranged in the hydraulic circuit with the highest pressure.

Figure 9:
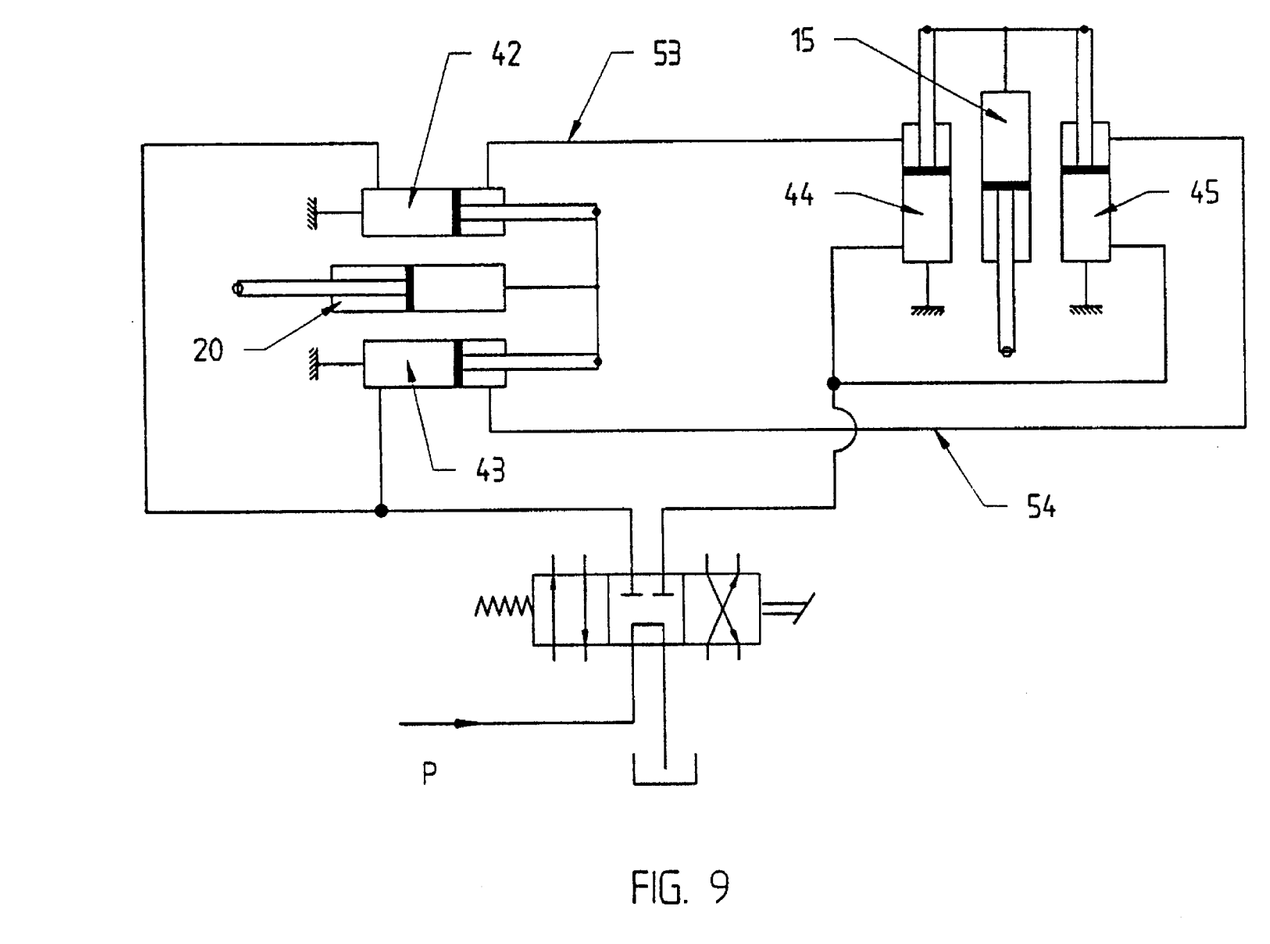
FIG. 9 is a principal diagram showing the unloading changes.

According to FIG. 9 the horizontal part 11 of the bucket-conveyor foot can be extended by extending the hydraulic cylinders 42 and 43. In order to compensate for the chain length during the change while unloading two vertical cylinders 44 and 45 are necessary which flank the vertical cylinder 15. The compartments of the additional horizontal cylinders 42 and 43 are connected with the respective additional vertical cylinders 44 and 45 by respective conduits 53 and 54.

The advantages of the apparatus according to the invention are in the passive adaptation of the bucket-conveyor foot to ship movements during use with a long compensation path. The digging force can be maintained constant during compensatory movement so that the capacity of the buckets is optimized. The sensitive force setting in the chain can allow use of a lighter chain. The hydraulic system can be altered without great expense for different heavier bucket-conveyor feet by combining the hydraulic circuits of FIGS. 3, 4, and 5 and controlling the conditions by a switchover device. The illustrated circuit enhancements make possible scooping from deep bulk material or cleaning up without difficulty. This allows one to dispense with the front loader normally needed for collecting the material.

Figure 12:
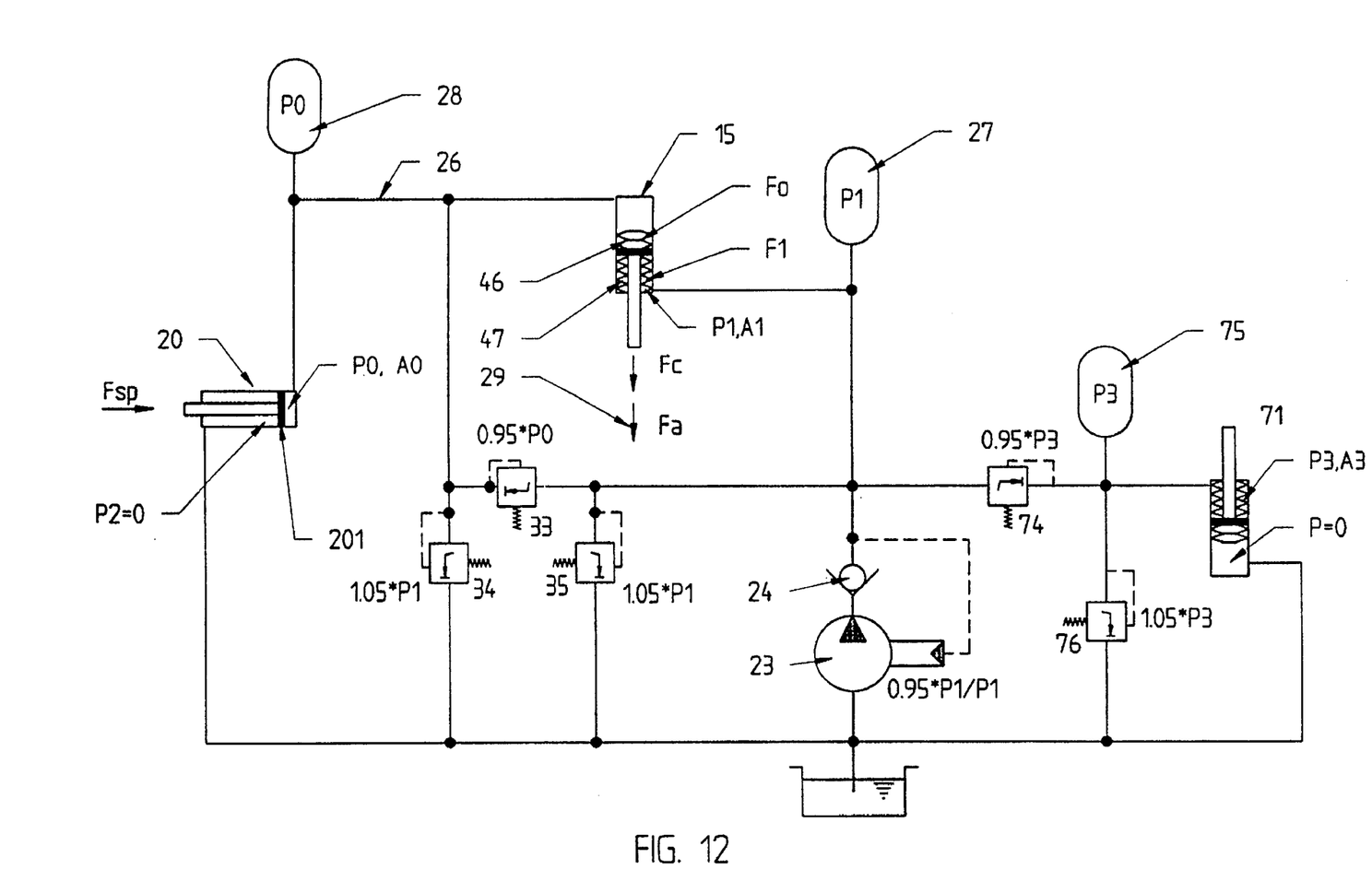
FIGS. 12 through 14 are principal diagrams of the hydraulic system for the embodiment according to FIGS. 10 and 11.
Figure 13:
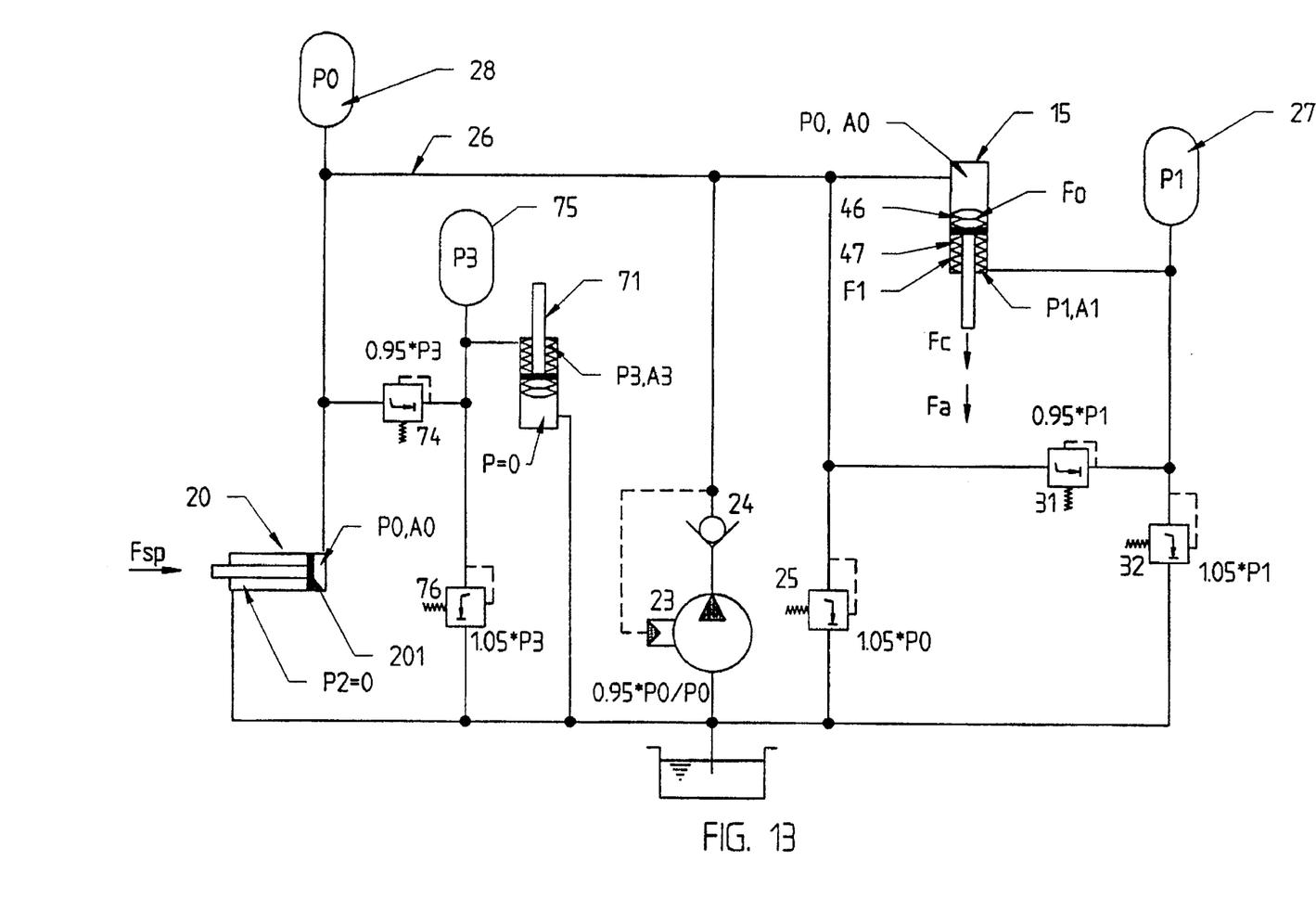
Figure 14:
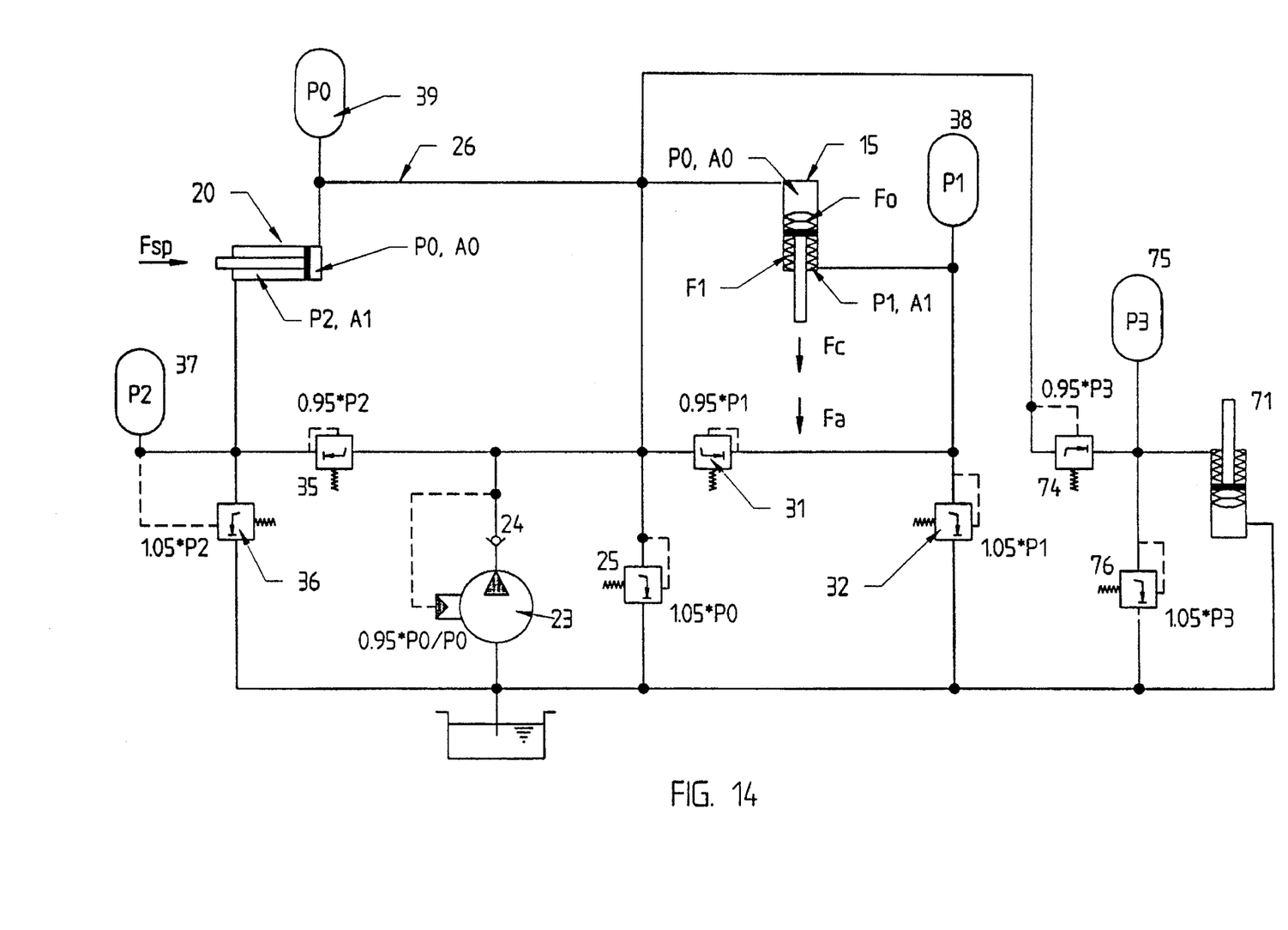

The circuit according to FIG. 12 corresponds generally to the circuit according to FIG. 3. Since additional (see FIGS. 10 and 11) tipping cylinders 71 and 72 must be actuated (with pressure $p_3$) there is a further pressure reservoir 75. The cylinder 71 works like the cylinder 15, the difference being that the change in length of the chain during pivoting of the horizontal section 11 about the pivot 73 is relatively small so that it can be compensated for by the pressure reservoir. Correspondingly additional valves 76 and 74 are provided to control variations of the pressure $p_3$ of more than 5%. The same is true for the circuits according to FIGS. 13 and 14 in which the same references as in FIGS. 4 and 5 are used for the same parts.

Figure 15:
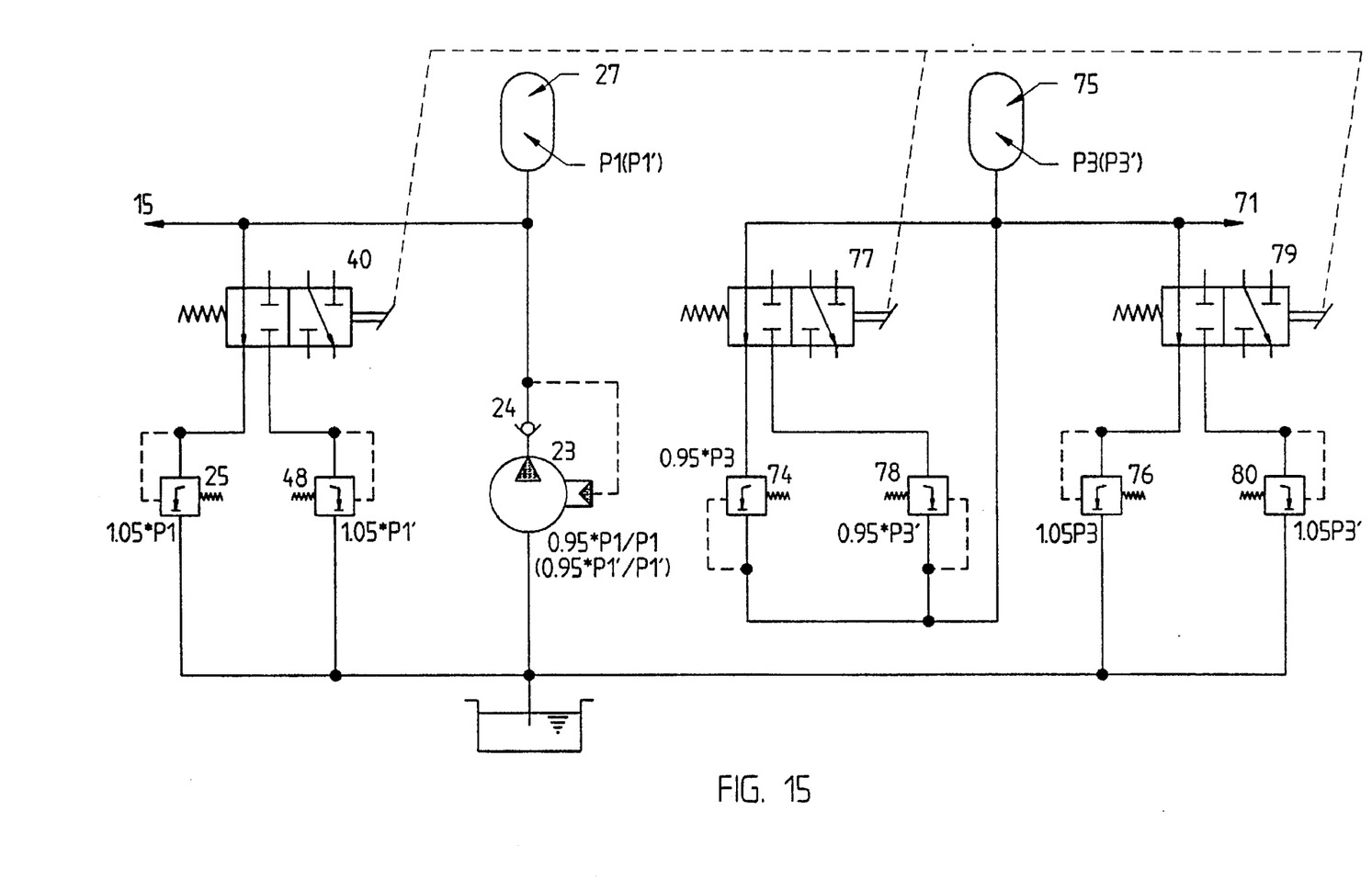
FIGS. 15 through 17 are views of the hydraulic system according to FIG. 12 with a cleaning-up circuit in various embodiments.
Figure 16:
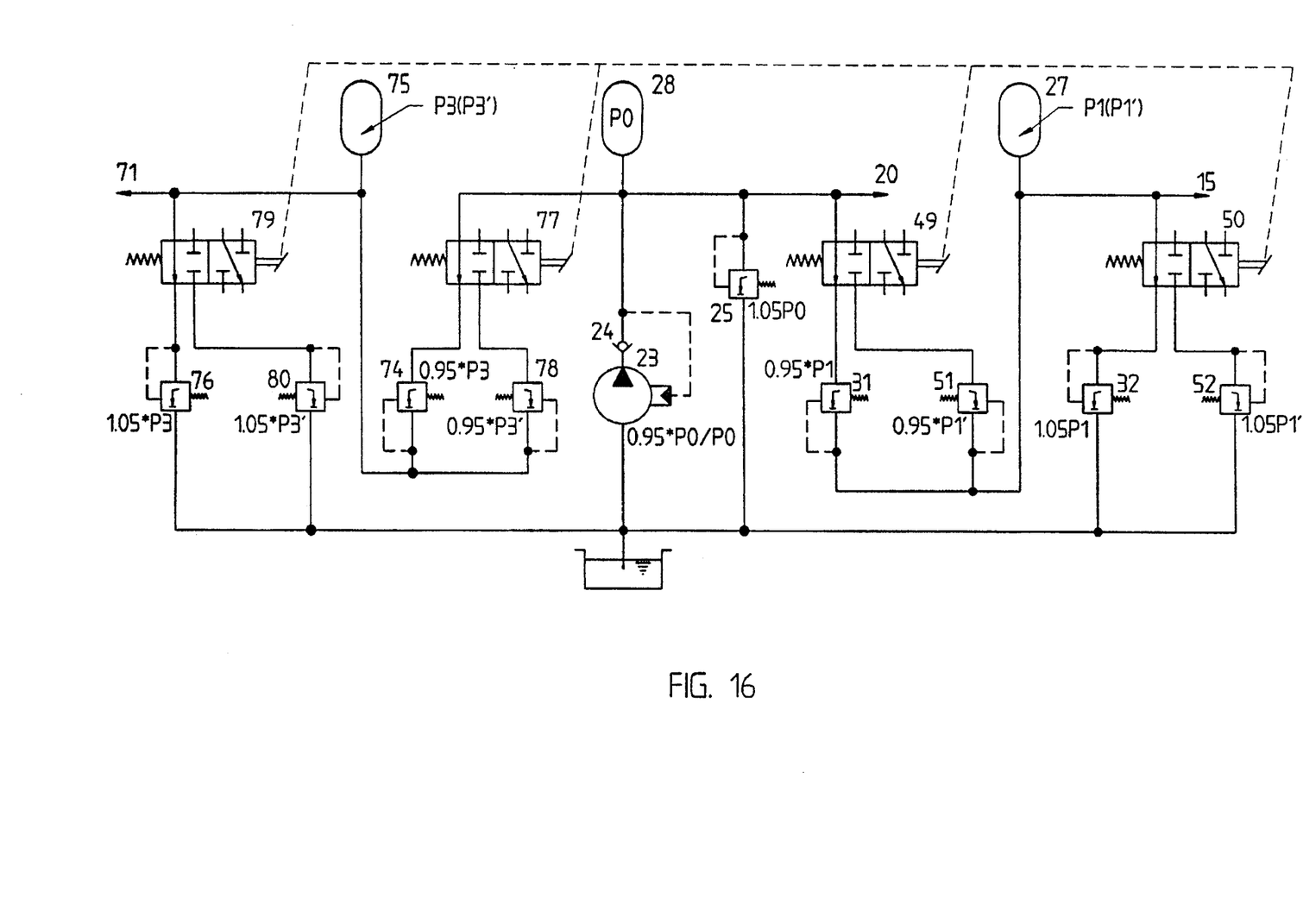
Figure 17:
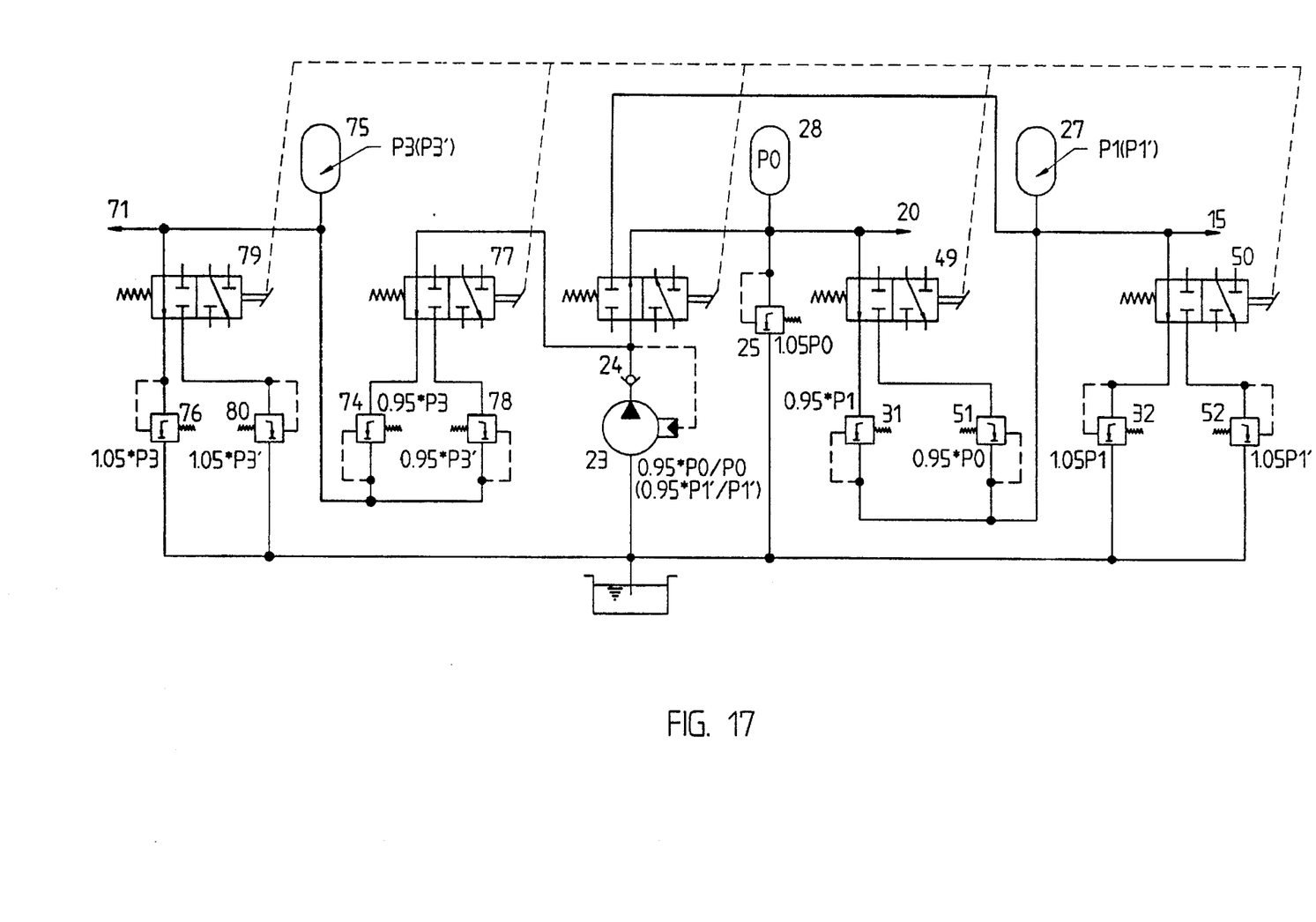

The circuits according to FIGS. 15, 16, and 17 represent embodiments for so-called cleaning-up use. In order to account for the limited need of force, the pressures $P_1$ and $p_3$ must be increased, which is done by the pressure-limiting valves 48, 78, and 80. In the FIG. 15 circuit, switchover is effected by three three-way valves 40, 77, and 79 and all three additional pressure-limiting valves protect the higher pressures $P_1$ and $p_3$ of the hydraulic system from excess pressurization.

Correspondingly the valves 31, 32 and 74, 76 in the circuits according to FIGS. 16 and 17 are replaced by switching of the valves 49, 49 and 77, 29 by the valves 51, 52 and 78, 80, while maintaining the relationship $p_0 > p_1$ in FIG. 16 and $p_0 < p_1$ in FIG. 17.

I claim:

1. An L-shaped bucket conveyor, in particular a boat unloader, having an endless tension element (13) on which buckets (12) are secured and a bucket-conveyor foot which has a generally vertical section (70) and a generally horizontal section (11), and at least one horizontal cylinder (29, 21) for tensioning and/or balancing the tension element (13) and at least one vertical cylinder (15) for supporting the bucket-conveyor foot, characterized in that the vertical and horizontal cylinders (15, 16, 20) are connected together via a hydraulic line (26) such that, absent active control intervention, extension of a vertical hydraulic-cylinder part due to a dropping of the bucket-conveyor foot (11) causes a corresponding retraction of the horizontal hydraulic-cylinder part and oppositely a retraction of the vertical hydraulic-cylinder part due to a raising of the bucket-conveyor foot causes a corresponding extension of the horizontal-cylinder part.

2. The bucket conveyor according to claim 1, characterized in that the vertical section (70) and the horizontal section (11) are connected together at a pivot (73) by means of at least one tipping cylinder (71, 27) for pivoting about a horizontal axis.

3. The bucket conveyor according to claim 2, characterized in that even a change in length of the chain can be compensated for by a change in the angle of the horizontal section (11).

4. The bucket conveyor according to claim 1, characterized in that the tension element is formed of two or more endless chains (13).

5. The bucket conveyor according to claim 1, characterized in that the hydraulic medium additionally pumpable by means of a switchable pump (23) into the vertical hydraulic cylinder (15, 16) compensates for the mass of the bucket conveyor or exerts an additional pressure ($P_1$) on the bucket-conveyor foot (11).

6. The bucket conveyor according to claim 1, characterized in that the switchable pump (23) is downstream of a check valve (24) and/or the pump (23) is switched on and off in accordance with pressure.

7. The bucket conveyor according to claim 1, characterized in that the vertical hydraulic cylinder (15, 16) is provided on both sides with an end-position damper (46, 47) for its piston.

8. The bucket conveyor according to claim 7, characterized by hydraulic or mechanical end-position damping, preferably via spring disks (46, 47) at the ends of the cylinder (15, 16).

9. The bucket conveyor according to claim 1, characterized by respective pressure reservoirs (27, 28; 37, 38, 29, 75) that are in the hydraulic lines and that are connected to and supply the compartments of the vertical hydraulic cylinder (15, 16) and/or of the horizontal hydraulic cylinder (20, 21) and/or of the tipping cylinder (71, 72).

10. The bucket conveyor according to claim 1, characterized in that respective pressure-limiting valves (25, 31 through 36, 48, 51, 52, 74, 76, 78, 80) are provided for stabilizing pressure, namely to compensate for length changes of the tension element (13) or the digging force of the bucket.

11. The bucket conveyor according to claim 1, characterized in that the vertical hydraulic cylinder (15, 16) has a sensor for detecting a predetermined maximum engagement force (29) and/or the height of the bucket-conveyor foot and/or and to initiate a lifting of the entire bucket conveyor (11).

12. The bucket conveyor according to claim 1, characterized in that in order to convey away the material remaining on the floor (clean up) there is a switchover to at least one further or additional pressure-limiting valve (48, 51, 52, 78, 80).

13. The bucket conveyor according to claim 1, characterized in that further vertical and horizontally arranged hydraulic cylinders (42 through 45) are provided to change the loading of the bucket-conveyor foot (11) parallel to the hydraulic cylinders (15, 16, 20, 21) provided for holding the bucket-conveyor foot (11) and for tightening and/or balancing the tension element.

14. The bucket conveyor according to claim 13, characterized in that the piston compartments of the further hydraulic cylinders (42, 43) are connected with the piston compartments of the additional vertical cylinders (44, 45) by hydraulic lines (53, 54).

* * * * *